(12) United States Patent
Murschall et al.

(10) Patent No.: US 6,277,474 B1
(45) Date of Patent: Aug. 21, 2001

(54) AMORPHOUS, TRANSPARENTLY DYED PLATE OF A CRYSTALLISABLE THERMOPLASTIC, PROCESS FOR ITS PRODUCTION AND ITS USE

(75) Inventors: Ursula Murschall, Nierstein; Wolfgang Gawrisch, Gau-Bischofsheim; Rainer Brunow, Eppstein, all of (DE)

(73) Assignee: Hostaglas, Ltd., Dublin (IE)

( * ) Notice: Subject to any disclaimer, the term of this patent is extended or adjusted under 35 U.S.C. 154(b) by 0 days.

(21) Appl. No.: 08/973,045

(22) PCT Filed: May 21, 1996

(86) PCT No.: PCT/EP96/02173

§ 371 Date: Jan. 26, 1998

§ 102(e) Date: Jan. 26, 1998

(87) PCT Pub. No.: WO96/38498

PCT Pub. Date: Dec. 5, 1996

(30) Foreign Application Priority Data

| | | |
|---|---|---|
| May 29, 1995 | (DE) | 195 19 578 |
| Jun. 19, 1995 | (DE) | 195 22 120 |
| Aug. 2, 1995 | (DE) | 195 28 334 |

(51) Int. Cl.$^7$ ............... B32B 27/14; B32B 3/00
(52) U.S. Cl. ............ 428/195; 428/220; 428/480; 264/148; 264/160; 264/210.1
(58) Field of Search ............... 264/148, 160, 264/151, 177.1, 210.1, 211.12; 428/195, 220, 480

(56) References Cited

U.S. PATENT DOCUMENTS

| | | | |
|---|---|---|---|
| 4,189,866 | * 2/1980 | Treadaway | 47/58 |
| 5,071,993 | 12/1991 | Leppard et al. | |
| 5,512,620 | * 4/1996 | Van Hout et al. | 524/84 |
| 5,800,911 | * 9/1998 | Sankey et al. | 428/213 |

FOREIGN PATENT DOCUMENTS

| | | |
|---|---|---|
| 0359710 | 3/1990 | (EP) . |
| 0680996 | 8/1995 | (EP) . |

OTHER PUBLICATIONS

Derwent Abstract No. JP 1242223.

* cited by examiner

Primary Examiner—Bruce H. Hess
Assistant Examiner—B. Shewareged
(74) Attorney, Agent, or Firm—Frommer Lawrence & Haug LLP (57) ABSTRACT

The invention relates to an amorphous, transparently colored sheet having a thickness in the range from 1 to 20 mm, which comprises, as the main constituent, at least one crystallizable the thermoplastic and a dyestuff which is soluble in the thermoplastic, to a process for its production and to its use.

32 Claims, 3 Drawing Sheets

Fig. 1a 2-(4,6-Diphenyl-1,3,5-triazin-2-yl)-5-(hexyl)oxyphenol

Fig. 1b 2,2′-Methylen-bis(6-(2H-benzotriazol-2-yl)-4-(1,1,3,3-tetramethylbutyl)-phenol

Fig. 2

Fig. 3d S-KALANDER

Fig. 3c L-KALANDER

Fig. 3b F-KALANDER

Fig. 3a I-KALANDER

Fig. 3

AMORPHOUS, TRANSPARENTLY DYED PLATE OF A CRYSTALLISABLE THERMOPLASTIC, PROCESS FOR ITS PRODUCTION AND ITS USE

The invention relates to an amorphous, transparently colored sheet of a crystallizable thermoplastic, the thickness of which is in the range from 1 to 20 mm. The sheet comprises at least one dyestuff soluble in the polymer and is distinguished by very good optical and mechanical properties. The invention furthermore relates to a process for the production of this sheet and to its use.

Amorphous, transparently colored sheets having a thickness of between 1 and 20 mm are adequately known. These sheet-like structures are made of amorphous, non-crystallizable thermoplastics. Typical examples of such thermoplastics which are processed to sheets are, for example, polyvinyl chloride (PVC), polycarbonate (PC) and polymethyl methacrylate (PMMA). These semi-finished products are produced on so-called extrusion lines (cf.

Polymer Werkstoffe [polymeric materials], Volume II, Technology 1, Georg Thieme Verlag, Stuttgart 1984). The pulverulent or granular raw material is melted in an extruder. After extrusion, the amorphous thermoplastics can easily be reshaped via polishing stacks or other shaping dies as a result of the constantly increasing viscosity of the amorphous thermoplastic with decreasing temperature. After shaping, amorphous thermoplastics then have an adequate stability, i.e. a high viscosity in order to "stand by themselves" in the sizing die. However, they are still soft enough to be able to be shaped by the die. The melt viscosity and internal rigidity of amorphous thermoplastics in the sizing die is so high that the semi-finished product does not collapse before cooling in the sizing die. In the case of materials which decompose easily, such as, for example, PVC, particular processing aids, such as, for example, processing stabilizers against decomposition and lubricants against too high an internal friction and therefore uncontrollable heating, are needed during extrusion. External lubricants are necessary to prevent the material from sticking to walls and rolls.

In the processing of PMMA, for example, a devolatilizing extruder is employed for the purpose of removal of moisture.

In the production of transparently colored sheets of amorphous thermoplastics, sometimes cost-intensive additives are necessary, which in some cases migrate and can lead to production problems as a result of evaporation and to surface deposits on the semi-finished product. PVC sheets are difficult to recycle or can be recycled only with special neutralization or electrolysis processes. PC and PMMA sheets are likewise difficult to recycle and can be recycled only with a loss of or extreme deterioration in the mechanical properties.

In addition to these disadvantages, PMMA sheets also have an extremely poor impact strength and splinter when fractured or under mechanical stress. In addition, PMMA sheets are readily combustible, so that they may not be employed, for example, for interior applications and in exhibition construction.

PMMA and PC sheets furthermore cannot be shaped in the cold. During cold shaping, PMMA sheets break up into hazardous splinters. During cold shaping of PC sheets, hair cracks and white fracture occur.

EP-A-0 471 528 describes a process for shaping an object from a polyethylene terephthalate (PET) sheet. The intrinsic viscosity of the PET employed is in the range from 0.5 to 1.2. The PET sheet is heat-treated on both sides in a thermoforming mold in a temperature range between the glass transition temperature and the melting temperature. The shaped PET sheet is removed from the old when the extent of crystallization of the shaped PET sheet is in the range from 25 to 50%. The PET sheets disclosed in EP-A-0 471 528 have a thickness of 1 to 10 mm. Since the thermoformed shaped article produced from this PET sheet is partly crystalline and therefore no longer transparent and the surface properties of the shaped article are determined by the thermoforming process and the temperatures and shapes given by this, the optical properties (for example gloss, clouding and light transmission) of the PET sheets employed are unimportant. As a rule, the optical properties of these sheets are poor and in need of optimization.

U.S. Pat. No. 3,496,143 describes vacuum thermoforming of a 3 mm thick PET sheet, the crystallization of which should be in the range from 5 to 25%. However, the crystallinity of the thermoformed shaped article is greater than 25%. On these PET sheets also, no requirements are imposed in respect of optical properties. Since the crystallinity of the sheets employed is already between 5 and 25%, these sheets are cloudy and nontransparent. These sheets comprise neither a dyestuff nor a light stabilizer.

Another disadvantage was that to date it has been possible to obtain amorphous sheets with crystallizable thermoplastics as the main constituent in a thickness of 1 mm or more only with difficulty and in unsatisfactory quality.

The object of the present invention is to provide an amorphous, transparently colored sheet having a thickness of 1 to 20 mm which has both good mechanical and good optical properties.

The good optical properties include, for example, a high light transmission, a high surface gloss, an extremely low clouding and a high image sharpness (clarity). The good mechanical properties include, inter alia, a high impact strength and a high fracture strength.

Furthermore, the sheet according to the invention should be recyclable, in particular without loss of mechanical properties, and poorly combustible, so that, for example, it can also be used for interior applications and in exhibition construction.

The object is achieved by an amorphous, transparently colored sheet having a thickness in the range from 1 to 20 mm, which comprises, as the main constituent, a crystallizable thermoplastic and a soluble dyestuff. The concentration of the soluble dyestuff is preferably in the range from 0.001 to 20% by weight, based on the weight of the crystallizable thermoplastic.

The present invention furthermore relates to a process for the production of this sheet having the features of claim 23. Preferred embodiments of this process are explained in the dependent claims 24 to 29.

Soluble dyestuffs are to be understood as meaning substances which are dissolved molecularly in the polymer (DIN 55949).

The change in color as a result of the coloration of the amorphous sheet is based on the wavelength-dependent absorption and/or scattering of light. Dyestuffs can only absorb and cannot scatter light, since the physical prerequisite for scattering is a certain minimum particle size.

Coloration with dyestuffs is a dissolving process. As a result of this dissolving process, the dyestuff is dissolved molecularly, for example in the crystallizable thermoplastic. Such colorations are called transparent or diaphanous or translucent or opaline.

Of the various classes of soluble dyestuffs, the fat- and aromatics-soluble dyestuffs are particularly preferred. These are, for example, azo and anthraquinone dyestuffs. They are particularly suitable for coloring PET, since migration of the dyestuff is limited because of the high glass transition temperature of PET.

(Literature J. Koerner: Losliche Farbstoffe in der Kunststoffindustrie [Soluble dyestuffs in the plastics industry] in VDI-Gesellschaft Kunststofftechnik: Einfarben von Kunststoffen [Coloring of plastics], VDI-Verlag, Dusseldorf 1975).

Suitable soluble dyestuffs are, for example: Solvent Yellow 93, a pyrazolone derivative, Solvent Yellow 16, a fat-soluble azo dyestuff, Fluorol Green-Gold, a fluorescent polycyclic dyestuff, Solvent Red 1, an azo dyestuff, azo dyestuffs such as Thermoplastic Red BS, Sudan Red BB, Solvent Red 138, an anthraquinone derivative, fluorescent benzopyran dyestuffs, such as Fluorol Red GK and Fluorol Orange GK, Solvent Blue 35, an anthraquinone dyestuff, Solvent Blue, a phthalocyanine dyestuff, and many others.

Mixtures of two or more of these soluble dyestuffs are also suitable. The amorphous, transparently colored sheet comprises, as the main constituent, a crystallizable thermoplastic. Suitable crystallizable or partly crystalline thermoplastics are, for example, polyethylene terephthalate, polybutylene terephthalate, cycloolefin polymers and cycloolefin copolymers, polyethylene terephthalate being preferred.

According to the invention, crystallizable thermoplastics are understood as meaning
crystallizable homopolymers,
crystallizable copolymers,
crystallizable compound materials,
crystallizable recycled material and
other variations of crystallizable thermoplastics.

Amorphous sheet in the context of the present invention is understood as meaning those sheets which are noncrystalline, although the crystallizable thermoplastic has a crystallinity of between 5% and 65%, preferably 25% to 65%. Noncrystalline, i.e. essentially amorphous, means that the degree of crystallinity is in general below 5%, preferably below 2%, and particularly preferably is 0%. Such a sheet is essentially in a non-orientated state.

The standard viscosity of the crystallizable thermoplastic SV (DCA), measured in dichloroacetic acid in accordance with DIN 53728, is between 800 and 6000, preferably between 950 and 5000, in particular between 1000 and 4000.

The intrinsic viscosity IV (DCA) is calculated as follows from the standard viscosity;

$$IV (DCA) = 6.67 \times 10^{-4} SV (DCA) + 0.118$$

The surface gloss of the sheet according to the invention, measured in accordance with DIN 67530 (measurement angle 20°), is greater than 100, preferably greater than 110, the light transmission, measured in accordance with ASTM D 1003, is in the range from 5 to 80%, preferably in the range from 10 to 70%, and the clouding of the sheet, measured in accordance with ASTM D 1003, is in the range from 2 to 40, preferably in the range from 3 to 35%.

In a particularly preferred embodiment, the transparent amorphous sheet according to the invention comprises, as the main constituent, crystallizable polyethylene terephthalate.

In the case of polyethylene terephthalate, preferably no fracture occurs on the sheet during measurement of the Charpy impact strength $a_n$ (measured in accordance with ISO 179/1D). Furthermore, the Izod notched impact strength $a_k$ (measured in accordance with ISO 180/1A) of the sheet is preferably in the range from 2.0 to 8.0 kJ/m$^2$, particularly preferably in the range from 4.0 to 6.0 kJ/m$^2$.

The image sharpness of the sheet, which is also called clarity and is measured under an angle of less than 2.5° (ASTM D 1003), is preferably greater than 93%, and particularly preferably greater than 94%.

Polyethylene terephthalate polymers having a crystallite melting point $T_m$, measured by DSC (Differential Scanning Calorimetry) with a heating-up rate of 10° C/minute, [lacuna] from 220° C. to 280° C., preferably 230° C. to 270° C., a crystallization temperature range $T_c$ of between 75° C. and 280° C., preferably 75° C. and 260° C., a glass transition temperature $T_g$ of between 65° C. and 90° C. and a density, measured in accordance with DIN 53479, of 1.30 to 1.45 g/cm$^3$ and a crystallinity of between 5% and 65%, preferably between 25% and 65%, are preferred polymers as starting materials for production of the sheet.

The bulk density, measured in accordance with DIN 53466, is preferably between 0.75 kg/dm$^3$ and 1.0 kg/dm$^3$, and particularly preferably between 0.80 kg/dm$^3$ and 0.90 kg/dm$^3$.

The polydispersity of the polyethylene terephthalate $M_w/M_n$; determined by means of GPC, is preferably between 1.5 and 6.0, and particularly preferably between 2.0 and 5.0.

The amorphous, transparently colored sheets according to the invention furthermore can additionally comprise at least one UV stabilizer. The concentration of the UV stabilizer is preferably in the range from 0.01 to 5% by weight, based on the weight of the crystallizable thermoplastic.

The UV stabilizer acts as a light stabilizer and protects the sheet and the shaped article produced therefrom, in particular in applications outdoors, from yellowing and deterioration of the mechanical properties as a result of photooxidative degradation by sunlight.

The amorphous, transparently colored sheets according to the invention which additionally comprise at least one UV stabilizer consequently also have an excellent UV stability, in addition to good mechanical and optical properties.

Light, in particular the ultraviolet portion of solar radiation, i.e. the wavelength range from 280 to 400 nm, initiates degradation processes in thermoplastics, as a consequence of which not only does the visual appearance change, owing to a change in color or yellowing, but the mechanical-physical properties are also adversely affected.

Inhibition of these photooxidative degradation processes is of considerable industrial and economic importance, since otherwise the possible uses of numerous thermoplastics are limited drastically.

Polyethylene terephthalates, for example, start to absorb UV light even at below 360 nm, and their absorption increases considerably below 320 nm and is very pronounced below 300 nm. The maximum absorption is between 280 and 300 nm.

In the presence of oxygen, chiefly chain splitting but no crosslinking is observed. Carbon monoxide, carbon dioxide and carboxylic acids are the predominant photooxidation products in terms of amount. In addition to direct photolysis of the ester groups, oxidation reactions which likewise result in the formation of carbon dioxide via peroxide radicals must also be taken into consideration.

The photooxidation of polyethylene terephthalates can also lead, via splitting of hydrogen in the α-position of the ester groups, to hydroperoxides and decomposition products thereof and to associated chain splitting (H. Day, D. M. Wiles: J. Appl. Polym. Sci. 16, 1972, Page 203).

UV stabilizers or UV absorbers as light stabilizers are chemical compounds which can intervene in the physical and chemical processes of light-induced degradation. Carbon black and other pigments can partly have the effect of light protection. However, these substances are unsuitable for sheets, since they lead to a change in color. Only organic and organometallic compounds which impart no or only an extremely slight color or change in color to the thermoplastic to be stabilized are suitable for amorphous sheets.

Suitable UV stabilizers as light stabilizers are, for example, 2-hydroxybenzophenones, 2-hydroxybenzotriazoles, organonickel compounds, salicylic esters, cinnamic acid ester derivatives, resorcinol monobenzoates, oxalic acid anilides, hydroxybenzoic esters, sterically hindered i:amines and triazines, 2-hydroxybenzotriazoles and triazines being preferred.

Figure 1A:
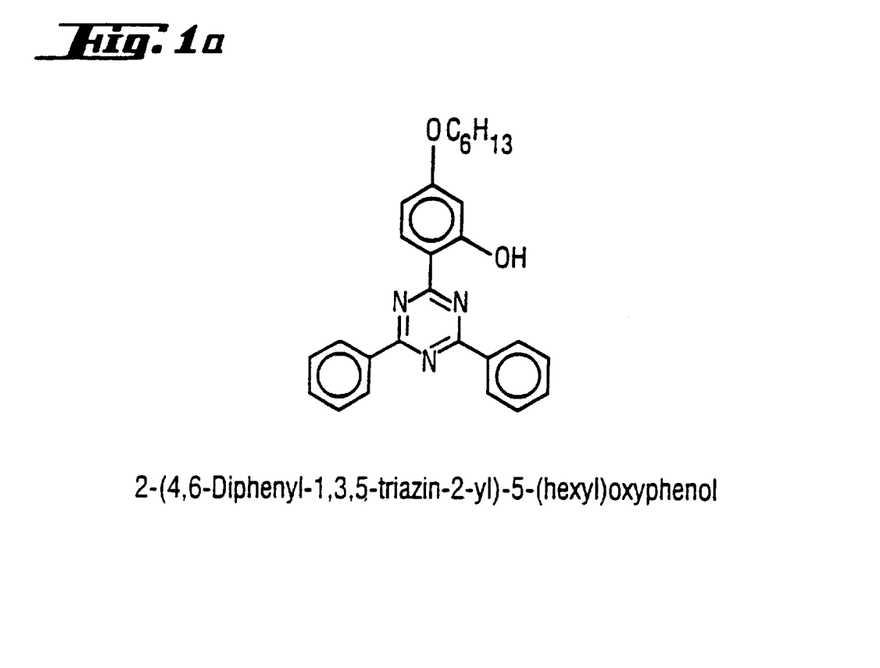
FIG. 1a depicts the structure of 2-(4,6-diphenyl-1,3,5-triazine-2-yl)-5-(hexyl)oxyphenol.
Figure 1B:
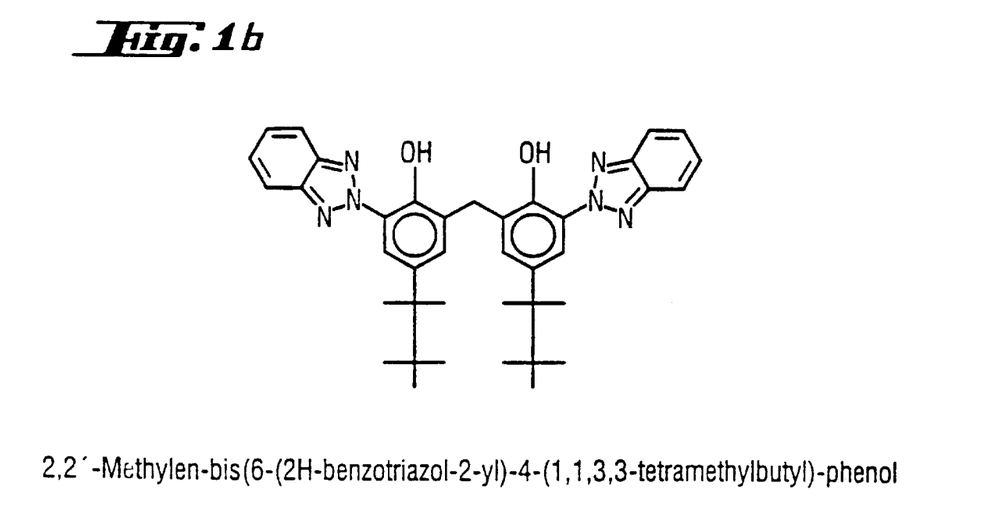
FIG. 1b depicts the structure of 2–2'-methylene-bis (6-(2H-benzotriazol-2-yl)-4-(1,1,3,3-tetramethylbutyl)-phenol.

In a particularly preferred embodiment, the amorphous, transparently colored sheet according to the invention comprises, as the main constituent, a crystallizable polyethylene terephthalate as the crystallizable thermoplastic and 0.01% by weight to 5.0% by weight of 2-(4,6-diphenyl-1,3,5-triazine-2-yl)-5-(hexyl)oxy-phenol (structure in FIG. 1a) or 0.01 % by weight to 5.0% by weight of 2,2'-methylene-bis(6-(2H-benzotriazol-2-yl)-4-(1,1,3,3-tetramethylbutyl)-phenol (structure in FIG. 1b). In a preferred embodiment, mixtures of these two UV stabilizers or mixtures of at least one of the two UV stabilizers with other UV stabilizers can also be employed, the total concentration of light stabilizers preferably being between 0.01% by weight and 5.0% by weight, based on the weight of crystallizable polyethylene terephthalate.

Weathering tests have shown that even after 5 to 7 years of external use, the stabilized sheets in general show no yellowing, no embrittlement, no loss of gloss on the surface, no cracking on the surface and no deterioration in the mechanical properties.

In addition, a good ability to be shaped in the cold without fracture, without hair cracks and/or without white fracture was found completely unexpectedly, so that athe sheet according to the invention can be shaped and bent without the action of temperature.

Furthermore, measurements have shown that the sheet according to the invention is poorly combustible and poorly flammable, so that the sheet according to the invention is suitable for interior use and in exhibition construction.

The sheet according to the invention furthermore can be recycled without problems, without pollution of the environment and without loss in the mechanical properties, which means that it is particularly suitable for use as short-lived advertising signs or other advertising articles. Since the dyestuff is soluble in the polymer, no agglomerates at all which would adversely influence the optical properties occur when the recycled material is reused.

According to the invention, the soluble dyestuff and, if appropriate, the light stabilizer, in the desired concentration, can already be metered in by the manufacturer of the raw materials, or can be metered into the extruder during production of the sheet.

However, addition of the color additive via masterbatch technology is particularly preferred. The soluble dyestuff and, if appropriate, the light stabilizer are dispersed and/or dissolved completely in a solid carrier material. Possible carrier materials are certain resins, the crystallizable thermoplastic itself, for example the polyethylene terephthalate polymer, or also other polymers which are sufficiently compatible with the crystallizable thermoplastic.

It is important that the particle size and the bulk density of the masterbatch are similar to the particle size and the bulk density of the crystallizable thermoplastic, so that homogeneous distribution and therefore a homogeneous, transparent coloration can take place.

Processes for the preparation of the crystallizable thermoplastics are known to the expert.

For example, polyethylene terephthalates are usually prepared by polycondensation in the melt or by a two-stage polycondensation, the first step being carried out in the melt up to a moderate molecular weight—corresponding to a moderate intrinsic viscosity IV of about 0.5 to 0.7— and the further condensation being carried out by solid condensation. The polycondensation is in general carried out in the presence of known polycondensation catalysts or catalyst systems. In the solid condensation, PET chips are heated at temperatures in the range from 180 to 320° C. under reduced pressure or under an inert gas until the desired molecular weight is reached.

The preparation of polyethylene terephthalate is described in detail in a large number of patents, such as, for example, in JP-A-60-139 717, DE-C-2 429 087, DE-A-27 07 491, DE-A-23 19 089, DE-A-16 94 461, JP-63-41 528, JP-62-39 621, DE-A-41 17 825, DE-A-42 26 737, JP-60-141 715, DE-A-27 21 501 and U.S. Pat. No. 5,296,586. 1% Polyethylene terephthalates having particularly high molecular weights can be prepared by polycondensation of dicarboxylic acid-diol precondensates (oligomers) at elevated temperature in a liquid heat transfer medium in the presence of customary polycondensation catalysts and, if appropriate, cocondensable modifying agents, if the liquid heat transfer medium is inert and free from aromatic structural groups and has a boiling point in the range from 200 to 320° C., the weight ratio of dicarboxylic acid-diol precondensate (oligomer) employed to liquid heat transfer medium is in the range from 20:80 to 80:20, and the polycondensation is carried out in a boiling reaction mixture in the presence of a dispersion stabilizer.

The production of the transparently colored, translucent, amorphous sheets according to the invention can be carried out by an extrusion process in an extrusion line.

Figure 2:
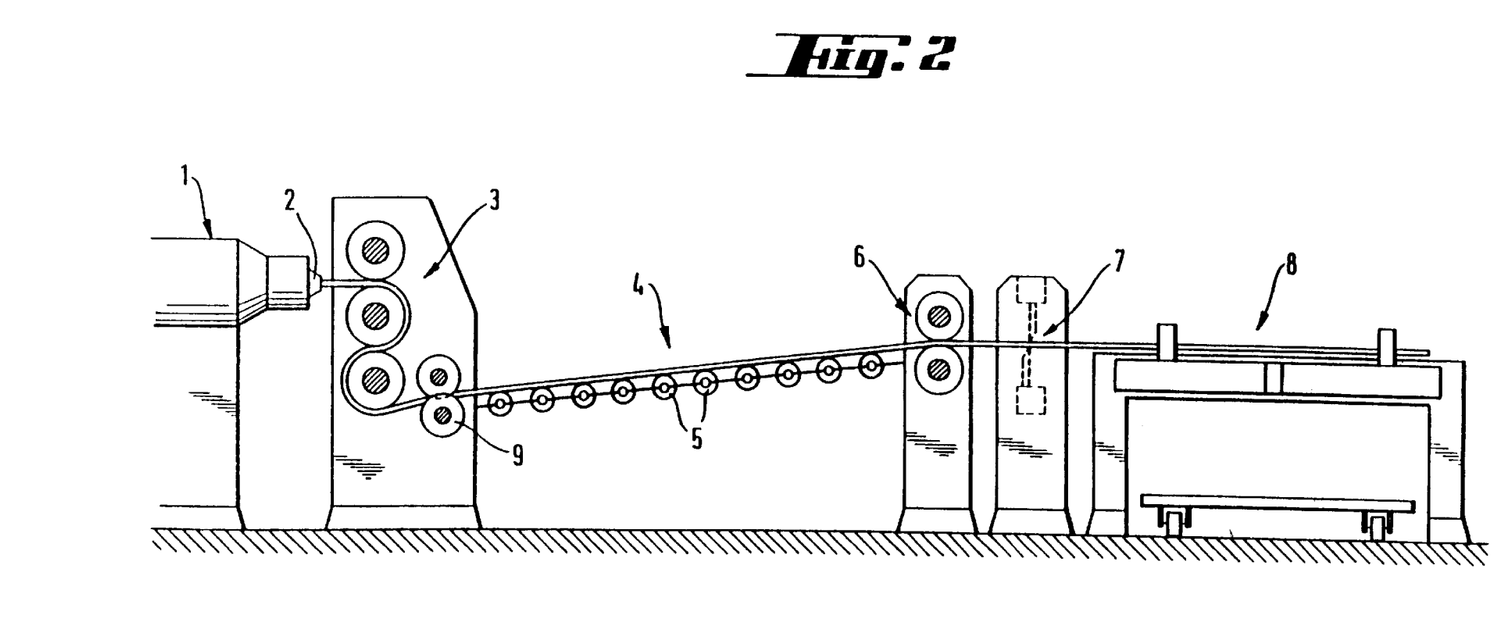
FIG. 2 depicts a diagram of an extrusion line.
Figure 3A:
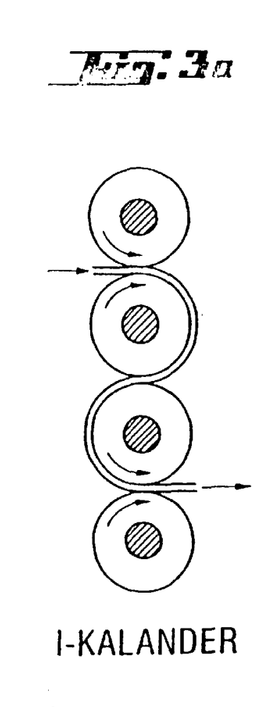
FIG. 3a depicts an I-shape calender roll.
Figure 3B:
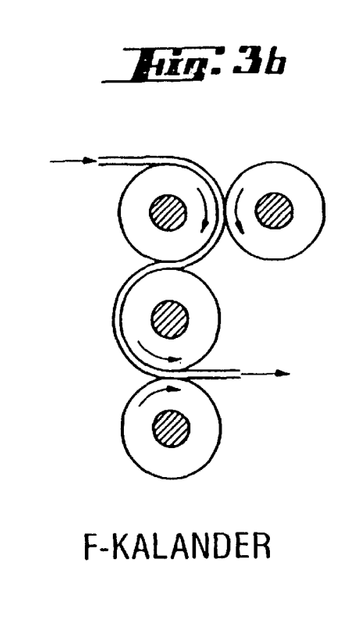
FIG. 3b depicts a F-shape calender roll.
Figure 3C:
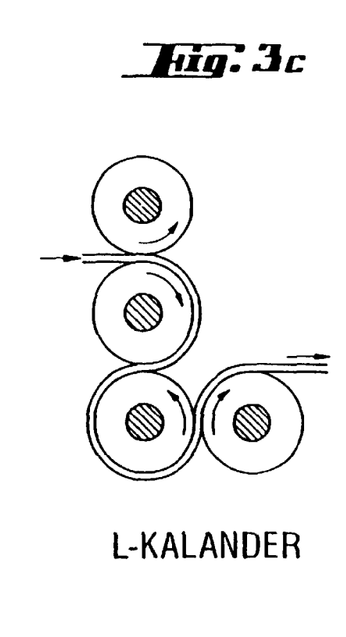
FIG. 3c depicts a L-shape calender roll.
Figure 3D:
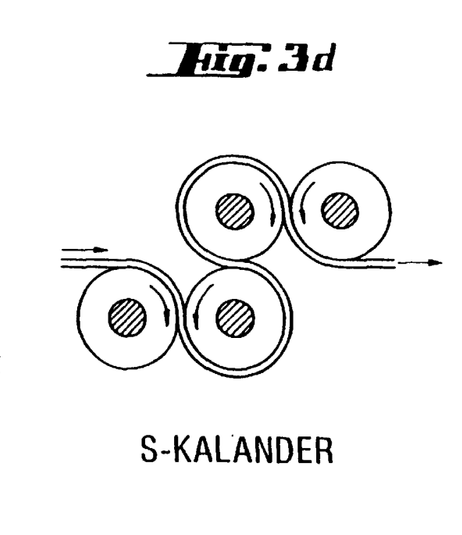
FIG. 3d depicts a S-shape calender roll.

Such an extrusion line is shown in diagram form in FIG. 2. It essentially comprises an extruder (1) as a plasticizing unit,
a slot die (2) as a die for shaping,
a polishing stack/calender (3) as a sizing die,
a cooling bed (4) and/or a roller conveyor (5) for after-cooling,
take-off rolls (6),
a separating saw (7),
an edge trimming device (9) and, if appropriate,
a stacking device (8).

The process for the production of the sheet according to the invention is described in detail below using the example of polyethylene terephthalate.

The process comprises drying the polyethylene terephthalate, if appropriate, and then melting it in the extruder, together with the soluble dyestuff and, if appropriate, with the UV stabilizer, shaping the melt through a die and then sizing it, polishing it and cooling it in the polishing stack, before the sheet is cut to dimension.

The polyethylene terephthalate is preferably dried, before the extrusion, at 160 to 180° C. for 4 to 6 hours.

The polyethylene terephthalate is melted in the extruder. The temperature of the PET melt is preferably in the range from 250 to 320° C., it then being possible for the temperature of the melt to be established essentially both by the temperature of the extruder and by the residence time of the melt in the extruder.

The melt then leaves the extruder through a die. This die is preferably a slot die.

The PET melted by the extruder and shaped by a slot die is sized by polishing calender rolls, i.e. cooled intensively and polished. The calender rolls can be arranged, for example, in an I-, F-, L- or S-shape (cf. FIG. 3).

The PET material can then be after-cooled on a roller conveyor, trimmed to size at the edges, cut to length and finally stacked.

The thickness of the PET sheet is essentially determined by the take-off, which is positioned at the end of the cooling zone, the cooling (polishing) rolls coupled to this in terms of speed, and the conveying speed of the extruder on the one hand and the distance between the rolls on the other hand.

Both single-screw and twin-screw extruders can be employed as the extruder.

The slot die preferably comprises the dismountable die body, the lips and the restrictor bar for flow regulation via the width. For this, the restrictor bar can be bent by tension and pressure screws. The thickness is set by adjusting the lips. It is important to ensure that the PET and the lip have a uniform temperature, since otherwise the PET melt flows out in different thicknesses as a result of the different flow paths.

The sizing die, i.e. the polishing calender, gives the PET melt the shape and the dimensions. This is effected by freezing to below the glass transition temperature by means of cooling and polishing. Shaping should no longer take place in this state, since otherwise surface defects would form in this cooled state. For this reason, the calender rolls are preferably driven jointly. The temperature of the calender rolls must be lower than the crystallite melting temperature in order to avoid sticking of the PET melt. The PET melt leaves the slot die with a temperature of 240 to 300° C.

The first polishing/cooling roll has a temperature of between 50° C. and 80° C., depending on the output and sheet thickness. The second, somewhat cooler roll cools the second or other surface. If the temperature of the first polishing/cooling roll is outside the stated range of 50° C. to 80° C., it is difficult to obtain an amorphous sheet having a thickness of 1 mm or more with the quality desired.

While the sizing device freezes the PET surfaces as smoothly as possible and cools the profile to the extent that it is dimensionally stable, the after-cooling device lowers the temperature of the PET sheet to virtually room temperature. After-cooling can take place on a roller board. The speed of the take-off should be coordinated precisely with the speed of the calender rolls in order to avoid defects and variations in thickness.

As additional devices, the extrusion line for production of sheets can comprise a separating saw as a device for cutting to length, the edge trimmer, the stacking unit and a control station. The edge or margin trimmer is advantageous, since under certain circumstances the thickness in the margin region may be nonuniform. The thickness and visual properties of the sheet are measured at the control station.

As a result of the surprising large number of excellent properties, the transparently colored, amorphous sheet according to the invention is outstandingly suitable for a large number of various uses, for example for interior paneling, for exhibition construction and exhibition articles, as displays, for signs, for protective glazing on machines and vehicles, in the illumination sector, in shop fitting and shelf construction, as advertising articles, as menu stands and as basketball target boards.

In the UV-stabilized embodiment, the sheet according to the invention is also suitable for external applications, such as, for example, greenhouses, roofing, exterior paneling, coverings, for applications in the building sector, illuminated advertising profiles, balcony paneling and roof exits.

The invention is illustrated in more detail in the following with the aid of embodiment examples, without being limited by these.

Measurement of the individual properties is carried out here in accordance with the following standards or methods:
Measurement Methods
Surface gloss:

The surface gloss is determined in accordance with DIN 67 30 530. The reflector value is measured as the optical parameter for the surface of a sheet. In accordance with the standards ASTM-D 523-78 and ISO 2813, the angle of incidence was set at 20°. Under the angle of incidence set, a ray of light strikes the flat test surface and is reflected or scattered by this. The rays of light incident on the photo-electronic receiver are indicated as a proportional electrical value. The measurement value is dimensionless and must be stated together with the angle of incidence.
Light Transmission:

Light transmission is to be understood as the ratio of the total light transmitted to the amount of incident light.

The light transmission is measured with the "Razegard plus" measuring instrument in accordance with ASTM 1003.
Clouding and Clarity:

Clouding is the percentage content of transmitted light which deviates from the incident light bundle by on average more than 2.5°. The image sharpness is determined under an angle of less than 2.5°.

The clouding and clarity are measured with the "Hazegard plus" measuring instrument in accordance with ASTM 1003.
Surface Defects:

The surface defects are determined visually.
Charpy Impact Strength $a_n$:

This value is determined in accordance with ISO 179/1 D
Izod Notched Impact Strength $a_k$:

The Izod notched impact strength or resistance $a_k$ is measured in accordance with ISO 180/1A
Density:

The density is determined in accordance with DIN 53479
SV (DCA), IV (DCA):

The standard viscosity SV (DCA) is measured in dichloroacetic acid in accordance with DIN 53726.

The intrinsic viscosity is calculated as follows from the standard viscosity $$IV\ (DCA) = 6.67 \times 10^{-4}\ SV\ (DCA) + 0.118$$

Thermal Properties:

The thermal properties, such as crystal melting point $T_m$, crystallization temperature range $T_c$, after-(cold-) crystallization temperature $T_{CN}$ and glass transition temperature $T_g$, are measured by means of differential scanning calorimetry (DSC) at a heating-up rate of 10° C./minute.
Molecular Weight, Polydispersity:

The molecular weights $M_w$ and $M_n$ and the resulting polydispersity $M_w/M_n$ are measured by means of gel permeation chromatography.

Weathering (Both Sides), UV Stability:

The UV stability is tested as follows in accordance with test specification ISO 4892

| Test apparatus | Atlas Ci 65 Weather Ometer |
| --- | --- |
| Test conditions | ISO 4892, i.e. simulated weathering |
| Irradiation time | 1000 hours (per side) |
| Irradiation | 0.5 W/m², 340 nm |
| Temperature | 63° C. |
| Relative atmospheric humidity | 50% |
| Xenon lamp | Inner and outer filter of borosilicate |
| Irradiation cycles | 102 minutes UV light, then 18 minutes UV light with spraying of the specimens with water, then 102 minutes UV light again and so on. |

Change in Color:

The change in color of the specimens after simulated weathering is measured with a spectrophotometer in accordance with DIN 5033.

The following symbols apply:

$\Delta L$: Difference in lightness

+$\Delta L$: This specimen is lighter than the standard

−$\Delta L$: This specimen is darker than the standard $\Delta A$: Difference in the red/green range +$\Delta A$: This specimen is redder than the standard −$\Delta A$: This specimen is greener than the standard $\Delta B$: Difference in the blue/yellow range +$\Delta B$: This specimen is yellower than the standard −$\Delta B$: This specimen is bluer than the standard $\Delta E$: Total change in color: $\Delta E = \sqrt{\Delta L^2 + \Delta A^2 + \Delta B^2}$ The greater the numerical deviation from the standard, the greater the difference in color.

Numerical values of $\leq 0.3$ are negligible and mean that there is no significant change in color.

All the sheets were weathered on both sides for 1000 hours each per side with the Atlas Ci 65 Weather Ometer from Atlas in accordance with the test specification ISO 4892, and were then tested in respect of mechanical properties, discoloration, surface defects, clouding and gloss.

In the following Examples 1 to 7 and Comparison Examples 1 and 2, the sheets are in each case single-layered, transparently colored sheets of different thickness produced on the extrusion line described.

EXAMPLE 1

A 2 mm thick, transparently colored, amorphous sheet which comprises, as the main constituent, polyethylene terephthalate and 2% by weight of the soluble dyestuff Solvent Red 138, an anthraquinone derivative from BASF (®Thermoplast G), is produced.

The polyethylene terephthalate from which the transparently colored, amorphous sheet is produced has a standard viscosity SV (DCA) of 1010, which corresponds to an intrinsic viscosity IV (DCA) of 0.79 dl/g. The moisture content is <0.2% and the density (DIN 53479) is 1.41 g/cm³. The crystallinity is 59%, the crystallite melting point according to DSC measurements being 258° C. The crystallization temperature range $T_c$ is between 83° C. and 258° C., the after-crystallization temperature (also cold-crystallization temperature) $T_{CN}$ being 144° C. The polydispersity $M_w/M_n$ of the polyethylene terephthalate polymer is 2.14.

The glass transition temperature is 83° C.

The soluble dyestuff Solvent Red 138 is added in the form of a masterbatch. The masterbatch is composed of 20% by weight of the dyestuff Solvent Red 138 as the active compound component and 80% by weight of the polyethylene terephthalate polymer described above as the carrier material.

Before the extrusion, 90% by weight of the polyethylene terephthalate polymer and 10% by weight of the masterbatch are dried in a drier at 170° C. for 5 hours, and then extruded in a single-screw extruder at an extrusion temperature of 286° C. through a slot die onto a polishing calender, the rolls of which are arranged S-shaped, and polished to a sheet 2 mm thick. The first calender roll has a temperature of 73° C. and the subsequent rolls each have a temperature of 67° C. The speed of the take-off and of the calender rolls is 6.5 m/minute.

After the after-cooling, the transparently colored PET sheet 2 mm thick is trimmed at the edges with separating saws, cut to length and stacked.

The PET sheet produced, colored a transparent red, has the following profile of properties:

| Thickness | 2 mm |
| --- | --- |
| Surface gloss 1st side (Measurement angle 20°) | 130 |
| 2nd side | 127 |
| Light transmission | 35.8% |
| Clarity | 99.1% |
| Clouding | 3.5% |
| Surface defects per m² (specks, orange-peel, bubbles and the like) | none |
| Charpy impact strength $a_n$ | no fracture |
| Izod notched impact strength $a_k$ | 4.2 kJ/m² |
| Cold shaping | good, no defects |
| Crystallinity | 0% |
| Density | 1.33 g/cm³ |

EXAMPLE 2

A transparently colored sheet is produced analogously to Example 1, a polyethylene terephthalate which has the following properties being employed:

| SV (DCA) | 1100 |
| --- | --- |
| IV (DCA) | 0.85 dl/g |
| Density | 1.38 g/cm³ |
| Crystallinity | 44% |
| Crystallite melting point $T_m$ | 245° C. |
| Crystallization temperature range $T_c$ | 82° C. to 245° C. |
| After-(cold-) crystallization temperature $T_{CN}$ | 152° C. |
| Polydispersity $M_w/M_n$ | 2.02 |
| Glass transition temperature | 82° C. |

The masterbatch is composed of 20% by weight of the dyestuff Solvent Red 138 and 80% by weight of the polyethylene terephthalate polymer of this Example (SV 1100).

The extrusion temperature is 280° C. The first calender roll has a temperature of 66° C. and the subsequent rolls a temperature of 60° C. The speed of the take-off and of the calender roll is 2.9 m/minute.

The PET sheet produced, which is colored a transparent red, has the following profile of properties:

| | |
|---|---|
| Thickness | 6 mm |
| Surface gloss 1st side (Measurement angle 20°) | 122 |
| 2nd side | 120 |
| Light transmission | 28.1% |
| Clarity | 98.9% |
| Clouding | 9.6% |
| Surface defects per m² (specks, orange-peel, bubbles and the like) | none |
| Charpy impact strength $a_n$ | no fracture |
| Izod notched impact strength $a_k$ | 4.8 kJ/m² |
| Cold shaping | good, no defects |
| Crystallinity | 0% |
| Density | 1.33 g/cm³ |

EXAMPLE 3

A transparently colored, translucent sheet is produced analogously to Example 1. The 2 mm thick, transparently colored sheet comprises 4% by weight of the soluble dyestuff Solvent Blue 35, a fat-soluble anthraquinone dyestuff from BASF (®Sudanblau 2).

The 4% by weight of the dyestuff Solvent Blue 35 are likewise added in the form of a masterbatch, the masterbatch being composed of 20% by weight of the dyestuff Solvent Blue 35 and 80% of the polyethylene terephthalate polymer from Example 1. 80% by weight of the polyethylene terephthalate polymer from Example 1 are employed with 20% by weight of the masterbatch.

The sheet produced, which is colored a transparent blue, has the following profile of properties:

| | |
|---|---|
| Thickness | 2 mm |
| Surface gloss 1st side (Measurement angle 20°) | 128 |
| 2nd side | 126 |
| Light transmission | 30.6% |
| Clarity | 99.0% |
| Clouding | 5.7% |
| Surface defects per m² (specks orange-peel, bubbles and the like) | none |
| Charpy impact strength $a_n$ | no fracture |
| Izod notched impact strength $a_k$ | 4.3 kJ/m² |
| Cold shaping | good, no defects |
| Crystallinity | 0% |
| Density | 1.33 g/cm³ |

EXAMPLE 4

A transparently colored sheet is produced analogously to Example 2. As in Example 3, the 6 mm thick, transparently colored sheet comprises 4% by weight of the soluble dyestuff Solvent Blue 35 (® Sudanblau 2 from BASF). As in Example 3, the 4% by weight of the dyestuff Solvent Blue 35 are added in the form of a masterbatch, the masterbatch being composed of 20% by weight of the dyestuff Solvent Blue 35 and 80% of the polyethylene terephthalate from Example 2.

The sheet produced, which is colored a transparent blue, has the following profile of properties:

| | |
|---|---|
| Thickness | 6 mm |
| Surface gloss 1st side (Measurement angle 20°) | 124 |
| 2nd side | 123 |
| Light transmission | 20.2% |
| Clarity | 98.4% |
| Clouding | 13.8% |
| Surface defects per m² (specks, orange-peel, bubbles and the like) | none |
| Charpy impact strength $a_n$ | no fracture |
| Izod notched impact strength $a_k$ | 5.0 kJ/m² |
| Cold shaping | good, no defects |
| Crystallinity | 0% |
| Density | 1.33 g/cm³ |

EXAMPLE 5

A transparently colored sheet is produced analogously to Example 2. The extrusion temperature is 275° C. The first calender roll has a temperature of 57° C. and the subsequent rolls have a temperature of 50° C. The speed of the take-off and of the calender roll is 1.7 m/minute.

The PET sheet produced has the following profile of properties:

| | |
|---|---|
| Thickness | 10 mm |
| Surface gloss 1st side (Measurement angle 20°) | 120 |
| 2nd side | 118 |
| Light transmission | 21.5% |
| Clarity | 98.4% |
| Clouding | 12.2% |
| Surface defects per m² (specks, orange-peel, bubbles and the like) | none |
| Charpy impact strength $a_n$ | no fracture |
| Izod notched impact strength $a_k$ | 5.3 kJ/m² |
| Cold shaping | good, no defects |
| Crystallinity | 0.1% |
| Density | 1.33 g/cm³ |

EXAMPLE 6

A transparently colored sheet is produced analogously to Example 5, a polyethylene terephthalate which has the following properties being employed:

| | |
|---|---|
| SV (DCA) | 1200 |
| IV (DCA) | 0.91 dl/g |
| Density | 1.37 g/m³ |
| Crystallinity | 36% |
| Crystallite melting point $T_m$ | 242° C. |
| Crystallization temperature range $T_c$ | 82° C. to 242° C. |
| After-(cold-) crystallization temperature $T_{CN}$ | 157° C. |
| Polydispersity $M_w/M_n$ | 2.2 |
| Glass transition temperature | 82° C. |

The extrusion temperature is 274° C. The first calender roll has a temperature of 50° C. and the subsequent rolls a temperature of 45° C. The speed of the take-off and of the calender rolls is 1.2 m/minute.

The transparently colored PET sheet produced has the following profile of properties:

| | |
|---|---|
| Thickness | 15 mm |
| Surface gloss 1st side (Measurement angle 20°) | 114 |
| 2nd side | 112 |
| Light transmission | 18.8% |
| Clarity | 95.4% |
| Clouding | 21.8% |
| Surface defects per m² (specks, orange-peel, bubbles and the like) | none |
| Charpy impact strength $a_n$ | no fracture |
| Izod notched impact strength $a_k$ | 5.9 kJ/m² |
| Cold shaping | good, no defects |
| Crystallinity | 0.5% |
| Density | 1.33 g/cm³ |

EXAMPLE 7

A transparently colored sheet is produced analogously to Example 2. 60% of polyethylene terephthalate from Example 2 are mixed with 30% of recycled material of this polyethylene terephthalate and 10% of the masterbatch.

The transparently colored sheet produced has the following profile of properties:

| | |
|---|---|
| Thickness | 6 mm |
| Surface gloss 1st side (Measurement angle 20°) | 118 |
| 2nd side | 117 |
| Light transmission | 28.2% |
| Clarity | 98.9% |
| Clouding | 9.9% |
| Surface defects per m² (specks, orange-peel, bubbles and the like) | none |
| Charpy impact strength $a_n$ | no fracture |
| Izod notched impact strength $a_k$ | 4.9 kJ/m² |
| Cold shaping | good, no defects |
| Crystallinity | 0% |
| Density | 1.33 g/cm³ |

COMPARISON EXAMPLE 1

A transparently colored sheet is produced analogously to Example 1. The polyethylene terephthalate employed has a standard viscosity SV (DCA) of 760, which corresponds to an intrinsic viscosity IV (DCA) of 0.62 dl/g. The other properties are identical to the properties of the polyethylene terephthalate from Example 1 in the context of measurement accuracy. The masterbatch employed is identical to the masterbatch from Example 1. The process parameters and the temperature were chosen as in Example 1. As a result of the low viscosity, no sheet production is possible. The stability of the melt is inadequate, so that the melt collapses before cooling on the calender rolls.

COMPARISON EXAMPLE 2

A transparently colored, translucent sheet is produced analogously to Example 2, the polyethylene terephthalate and masterbatch from Example 2 also being employed. The first calender roll has a temperature of 83° C. and the subsequent rolls each have a temperature of 77° C.

The sheet produced is an extremely cloudy red and almost opaque. The light transmission, clarity and gloss are significantly reduced. The sheet shows surface defects and structures. Optical properties are unacceptable for a transparent colored application.

The sheet produced has the following profile of properties:

| | |
|---|---|
| Thickness | 6 mm |
| Surface gloss 1st side (Measurement angle 20°) | 86 |
| 2nd side | 88 |
| Light transmission | 8% |
| Clarity | not measurable |
| Clouding | not measurable |
| Surface defects per m² (specks, orange-peel, bubbles and the like) | bubbles, orange-peel |
| Charpy impact strength $a_n$ | no fracture |
| Izod notched impact strength $a_k$ | 5.0 kJ/m² |
| Cold shaping | good |
| Crystallinity | about 8% |
| Density | 1.34 g/cm³ |

The following Examples 8 to 16 and Comparison Examples 3 to 6 each relate to single-layered UV-stabilized, transparently colored sheets of different thickness, which are produced on the extrusion line described.

EXAMPLE 8

A 2 mm thick, transparently colored, amorphous sheet which comprises, as the main constituent, polyethylene terephthalate as described in Example 1 and 1.0% by weight of the UV stabilizer 2-(4,6-diphenyl-1,3,5-triazin-2-yl)-5-(hexyl)oxyphenol (®Tinuvin 1577 from Ciba-Geigy) and 2% by weight of the soluble dyestuff Solvent Red 138, an anthraquinone derivative from BASF (®Thermoplast G), is produced.

Tinuvin 1577 has a melting point of 149° C. and is heat-stable up to about 330° C.

For the purpose of homogeneous distribution, 1.0% by weight of the UV stabilizer is incorporated into the polyethylene terephthalate directly by the producer of the raw material.

The dyestuff is added by means of a masterbatch, as described in Example 1.

Before the extrusion, 90% by weight of the polyethylene terephthalate treated with 1% by weight of ®Tinuvin 1577 and 10% by weight of the masterbatch are dried in a dryer at 170° C. for 5 hours and processed analogously to Example 1.

The UV-stabilized, transparently colored PET sheet produced has the same profile of properties as the sheet in Example 1:

After weathering for in each case 1000 hours per side with the Atlas Ci 65 Weather Ometer, the PET sheet has the following properties:

| | |
|---|---|
| Thickness | 2 mm |
| Surface gloss 1st side (Measurement angle 20°) | 129 |
| 2nd side | 127 |
| Light transmission | 35.8% |
| Clarity | 91.0% |
| Clouding | 3.4% |
| Total discoloration ΔE | 0.22 |

| | |
|---|---|
| Surface defects (cracks, embrittlement) | none |
| Charpy impact strength $a_n$ | no fracture |
| Izod notched impact strength $a_k$ | 4.1 kJ/m² |
| Cold shaping | good, no defects |
| Crystallinity | 0% |

EXAMPLE 9

A transparently colored sheet is produced analogously to Example 8, the UV stabiliser 2-(4,6-diphenyl-1,3,5-triazin-2-yl)-5-(hexyl)oxyphenol (®Tinuvin 1577) being metered into the polymer in the form of a masterbatch.

The masterbatch is composed of 5% by weight of ®Tinuvin 1577 as the active compound component and 95% by weight of the polyethylene terephthalate from Example 8.

The soluble dyestuff Solvent Red 138 is likewise added in the form of a masterbatch. The dyestuff masterbatch is composed of 20% by weight of the dyestuff Solvent Red 138 as the active compound component and 80% by weight of the polyethylene terephthalate from Example 8.

Before the extrusion, 70% by weight of the polyethylene terephthalate from Example 1 are dried with 10% by weight of the dyestuff masterbatch and 20% by weight of the stabilizer masterbatch in a drier at 170° C. for 5 hours. The extrusion and the sheet production are carried out analogously to Example 8.

The UV-stabilized, transparently colored sheet produced has the following profile of properties,

| | |
|---|---|
| Thickness | 2 mm |
| Coloration | transparent red |
| Surface gloss 1st side (Measurement angle 20°) | 132 |
| 2nd side | 131 |
| Light transmission | 36.1% |
| Clarity | 99.2% |
| Clouding | 3.3% |
| Surface defects (specks, orange-peel, bubbles) | none |
| Charpy impact strength $a_n$ | no fracture |
| Izod notched impact strength $a_k$ | 4.3 kJ/m² |
| Cold shaping | good, no defects |
| Crystallinity | 0% |
| Density | 1.33 g/cm³ |

After weathering for in each case 1000 hours per side with the Atlas Ci 65 Weather Ometer, the PET sheet has the following properties:

| | |
|---|---|
| Thickness | 2 mm |
| Surface gloss 1st side (Measurement angle 20°) | 130 |
| 2nd side | 130 |
| Light transmission | 35.9% |
| Clarity | 99.2% |
| Clouding | 3.4% |
| Total discoloration ΔE | 0.20 |
| Surface defects (cracks, embrittlement) | none |
| Charpy impact strength $a_n$ | no fracture |
| Izod notched impact strength $a_k$ | 4.3 kJ/m² |
| Cold shaping | good, no defects |
| Crystallinity | 0% |

EXAMPLE 10

A UV-stabilized, transparently colored sheet is produced analogously to Example 8, the polyethylene terephthalate according to Example 2 being employed.

The polyethylene terephthalate is treated with 1% by Sweight of Tinuvin 1577 as in Example 8, the UV stabilizer being incorporated directly by the producer of the raw materials.

The masterbatch is composed of 20% by weight of the dyestuff Solvent Red 138 and 80% by weight of the polyethylene terephthalate of this Example (SV 1100).

The extrusion temperature is 280° C. The first calender roll has a temperature of 66° C. and the subsequent rolls have a temperature of 60° C. The speed of the take-up and of the calender roll is 2.9 m/minute.

The process used here corresponds to the process according to Example 2. The UV-stabilized PET sheet produced, which is colored a transparent red, has the same profile of properties as in Example 2.

After weathering for in each case 1000 hours per side with the Atlas Ci 65 Weather Ometer, the PET sheet has the following properties:

| | |
|---|---|
| Thickness | 6 mm |
| Surface gloss 1st side (Measurement angle 20°) | 118 |
| 2nd side | 118 |
| Light transmission | 28.0% |
| Clarity | 98.9% |
| Clouding | 9.7% |
| Total discoloration ΔE | 0.54 |
| Surface defects (cracks, embrittlement) | none |
| Charpy impact strength $a_n$ | no fracture |
| Izod notched impact strength $a_k$ | 4.7 kJ/m² |
| Cold shaping | good, no defects |
| Crystallinity | 0% |

EXAMPLE 11

A UV-stabilized, transparently colored sheet is produced analogously to Example 8. The 2 mm thick, transparently colored sheet comprises 4% by weight of the soluble dyestuff Solvent Blue 35, a fat-soluble anthraquinone dyestuff from BASF (®Sudanblau 2).

The 4% by weight of the dyestuff Solvent Blue 35 are likewise added in the form of a masterbatch, the masterbatch being composed of 20% by weight of the dyestuff Solvent Blue 35 and 80% of the polyethylene terephthalate from Example 8. 80% by weight of the polyethylene terephthalate from Example 8 are employed with 20% by weight of the masterbatch.

The process used here corresponds to the process according to Example 3. The sheet produced, which is colored a transparent blue, has the same profile of properties as the sheet in Example 3.

After weathering for in each case 1000 hours per side with the Atlas Ci 65 Weather Ometer, the PET sheet has the following properties:

| | |
|---|---|
| Thickness | 2 mm |
| Surface gloss 1st side (Measurement angle 20°) | 127 |
| 2nd side | 126 |
| Light transmission | 30.4% |
| Clarity | 99.0% |
| Clouding | 5.8% |
| Total discoloration ΔE | 0.30 |
| Surface defects (cracks, embrittlement) | none |
| Charpy impact strength $a_n$ | no fracture |
| Izod notched impact strength $a_k$ | 4.3 kJ/m$^2$ |
| Cold shaping | good, no defects |
| Crystallinity | 0% |

EXAMPLE 12

A transparently colored sheet is produced analogously to Example 10. The 6 mm thick, transparently colored sheet comprises, as in Example 11, 4% by weight of the soluble dyestuff Solvent Blue 35 (®Sudanblau 2 from BASF). As in Example 11, the 4% by weight of the dyestuff Solvent Blue are added in the form of a masterbatch, the masterbatch being composed of 20% by weight of the dyestuff Solvent Blue 35 and 80% of the polyethylene terephthalate from Example 9.

The process used here corresponds to the process according to Example 4. The sheet produced, which is colored a transparent blue, has the same profile of properties as the sheet in Example 4.

After weathering for in each case 1000 hours per side ith the Atlas Ci 65 Weather Ometer, the PET sheet has the following properties:

| | |
|---|---|
| Thickness | 6 mm |
| Surface gloss 1st side (Measurement angle 20°) | 122 |
| 2nd side | 122 |
| Light transmission | 20.1% |
| Clarity | 98.2% |
| Clouding | 14.0% |
| Total discoloration ΔE | 0.72 |
| Surface defects (cracks, embrittlement) | none |
| Charpy impact strength $a_n$ | no fracture |
| Izod notched impact strength $a_k$ | 4.8 kJ/m$^2$ |
| Cold shaping | good, no defects |
| Crystallinity | 0% |

EXAMPLE 13

A sheet colored a transparent blue is produced analogously to Example 12. The extrusion temperature is 275° C. The first calender roll has a temperature of 57° C. and subsequent rolls have a temperature of 50° C. The speed of the take-off and of the calender roll is 1.7 m/minute.

The process used here corresponds for process according to Example 5. The PET sheet produced has the same profile of properties as the sheet according to Example 5.

After weathering for in each case 1000 hours per side with the Atlas Ci 65 Weather Ometer, the PET sheet has the following properties:

| | |
|---|---|
| Thickness | 10 mm |
| Surface gloss 1st side (Measurement angle 20°) | 118 |
| 2nd side | 117 |
| Light transmission | 21.4% |
| Clarity | 98.3% |
| Clouding | 12.3% |
| Total discoloration ΔE | 0.68 |
| Surface defects (cracks, embrittlement) | none |
| Charpy impact strength $a_n$ | no fracture |
| Izod notched impact strength $a_k$ | 5.1 kJ/m$^2$ |
| Cold shaping | good, no defects |
| Crystallinity | 0% |

EXAMPLE 14

A transparently colored sheet is produced analogously to Example 13, the polyethylene terephthalate according to Example 6 (SV 1200) being employed.

The extrusion temperature is 274° C. The first calender roll has a temperature of 50° C. and the subsequent rolls a temperature of 45° C. The speed of the take-off and of the calender rolls is 1.2 m/minute.

The process used here corresponds to the process according to Example 6. The UV-stabilized, transparently colored PET sheet produced has the same profile of properties as the sheet according to Example 6.

After weathering for in each case 1000 hours per side with the Atlas Ci 65 Weather Ometer, the PET sheet has the following properties:

| | |
|---|---|
| Thickness | 15 mm |
| Surface gloss 1st side (Measurement angle 20°) | 111 |
| 2nd side | 112 |
| Light transmission | 18.9% |
| Clarity | 95.3% |
| Clouding | 21.9% |
| Total discoloration ΔE | 0.62 |
| Surface defects (cracks, embrittlement) | none |
| Charpy impact strength $a_n$ | no fracture |
| Izod notched impact strength $a_k$ | 5.7 kJ/m$^2$ |
| Cold shaping | good, no defects |
| Crystallinity | 0.5% |

EXAMPLE 15

A UV-stabilized, transparently colored sheet is produced analogously to Example 10. 60% of polyethylene terephthalate from Example 10 are mixed with 30% of recycled material of this polyethylene terephthalate and 10% of the masterbatch from Example 10.

The process used here corresponds to the process according to Example 7. The transparently colored sheet produced has the same profile of properties as the sheet according to Example 7.

After weathering for in each case 1000 hours per side with the Atlas Ci 65 Weather Ometer, the PET sheet has the following properties:

| | |
|---|---|
| Thickness | 6 mm |
| Surface gloss 1st side | 118 |
| (Measurement angle 20°) | |
| 2nd side | 115 |
| Light transmission | 28.4% |
| Clarity | 98.8% |
| Clouding | 10.0% |
| Total discoloration ΔE | 0.61 |
| Surface defects (cracks, embrittlement) | none |
| Charpy impact strength $a_n$ | no fracture |
| Izod notched impact strength $a_k$ | 4.7 kJ/m$^2$ |
| Cold shaping | good, no defects |
| Crystallinity | 0% |

EXAMPLE 16

A UV-stabilized sheet colored a transparent red is produced analogously to Example 10, 0.6% by weight of the UV stabilizer 2,2'-methylene-bis(6-(2H-benzotriazol-2-yl)-4-(1,1,3,3-tetramethylbutyl)-phenol (®Tinuvin 360 from Ciba-Geigy), based on the weight of the polymer, being employed as the UV stabilizer.

Tinuvin 360 has a melting point of 195° C. and is heat-stable up to about 350° C.

As in Example 8, 0.6% by weight of the UV stabilizer is incorporated into the polyethylene terephthalate directly by the producer of the raw materials.

The transparently colored PET sheet produced has the following profile of properties:

| | |
|---|---|
| Thickness | 6 mm |
| Coloration | transparent red |
| Surface gloss 1st side | 128 |
| (Measurement angle 20°) | |
| 2nd side | 126 |
| Light transmission | 28.9% |
| Clarity | 99.1% |
| Clouding | 9.3% |
| Surface defects per m$^2$ (specks, orange-peel, bubbles and the like) | none |
| Charpy impact strength $a_n$ | no fracture |
| Izod notched impact strength $a_k$ | 5.0 kJ/m$^2$ |
| Cold shaping | good, no defects |
| Crystallinity | 0% |
| Density | 1.33 g/cm$^3$ |

After weathering for in each case 1000 hours per side with the Atlas Ci 65 Weather Ometer, the PET sheet has the following properties:

| | |
|---|---|
| Thickness | 6 mm |
| Surface gloss 1st side | 125 |
| (Measurement angle 20°) | |
| 2nd side | 125 |
| Light transmission | 28.7% |
| Clarity | 89.9% |
| Clouding | 9.5% |
| Total discoloration ΔE | 0.68 |
| Surface defects (cracks, embrittlement) | none |
| Charpy impact strength $a_n$ | no fracture |
| Izod notched impact | 4.8 kJ/m$^2$ |
| strength $a_k$ | |
| Cold shaping | good, no defects |
| Crystallinity | 0% |

COMPARISON EXAMPLE 3

A transparently colored, UV-stabilized sheet is produced analogously to Example 8. The polyethylene terephthalate employed has a standard viscosity SV (DCA) of 760, which corresponds to an intrinsic viscosity IV (DCA) of 0.62 dl/g. The other properties are identical to the properties of the polyethylene terephthalate from Example 1 in the context of measurement accuracy. The masterbatch employed is identical to the masterbatch from Example 1. The process parameters and the temperature were chosen as in Example 1. As a result of the low viscosity, no sheet production is possible. The stability of the melt is inadequate, so that the melt collapses before cooling on the calender rolls.

COMPARISON EXAMPLE 4

A UV-stabilized, transparently colored, translucent sheet is produced analogously to Example 10, the polyethylene terephthalate, the UV stabilizer and the masterbatch from Example 10 also being employed. The first calender roll has a temperature of 83° C. and the subsequent rolls each have a temperature of 77° C.

The sheet produced is an extremely cloudy red and almost opaque. The light transmission, the clarity and the gloss are reduced significantly. The sheet shows surface defects and structures. The visual properties are unacceptable for a transparent colored application.

The sheet produced has the following profile of properties:

| | |
|---|---|
| Thickness | 6 mm |
| Surface gloss 1st side | 86 |
| (Measurement angle 20°) | |
| 2nd side | 88 |
| Light transmission | 8% |
| Clarity | not measurable |
| Clouding | not measurable |
| Surface defects per m$^2$ (specks, orange-peel, bubbles and the like) | bubbles, orange-peel |
| Charpy impact strength $a_n$ | no fracture |
| Izod notched impact strength $a_k$ | 5.0 kJ/m$^2$ |
| Cold shaping | good |
| Crystallinity | about 8% |
| Density | 1.34 g/cm$^3$ |

Because of the unacceptable visual properties, the 6 mm sheet was not exposed to a weathering test.

COMPARISON EXAMPLE 5

The sheet which is colored a transparent red, was obtained in Example 1 and, in contrast to Example 8, comprises no UW stabilizer is exposed to weathering.

After weathering for in each case 1000 hours per side with [lacuna] Atlas Ci 65 Weather Ometer, the PET sheet has the following properties:

| | |
|---|---|
| Thickness | 2 mm |
| Surface gloss 1st side (Measurement angle 20°) | 92 |
| 2nd side | 94 |
| Light transmission | 28.9% |
| Clarity | 80.6% |
| Clouding | 5.8% |
| Total discoloration ΔE | 4.28 |
| Surface defects (cracks, embrittlement) | embrittlement |
| Charpy impact strength $a_n$ | complete fracture at 36.7 kJ/m² |
| Izod notched impact strength $a_k$ | 1.4 kJ/m² |
| Cold shaping | crack formation |
| Crystallinity | partial on the surface |

Visually, the sheet shows a significant deterioration of the optical properties and a perceptible change in color. The surfaces are attacked (dull and brittle).

COMPARISON EXAMPLE 6

The sheet produced, which is colored a transparent red, was obtained in Example 2 and, in contrast to Example 10, comprises no UV stabilizer, is exposed to weathering.

After weathering for in each case 1000 hours per side with [lacuna] Atlas Ci 65 Weather Ometer, the PET sheet has the following properties:

| | |
|---|---|
| Thickness | 6 mm |
| Surface gloss 1st side (Measurement angle 20°) | 87 |
| 2nd side | 86 |
| Light transmission | 20.1% |
| Clarity | 79.8% |
| Clouding | 13.9% |
| Total discoloration ΔE | 4.64 |
| Surface defects (cracks, embrittlement) | embrittlement |
| Charpy impact strength $a_n$ | complete fracture at 56.2 kJ/m² |
| Izod notched impact strength $a_k$ | 1.9 kJ/m² |
| Cold shaping | crack formation |
| Crystallinity | partial development of crystallization visible on the surface. |

The following examples 17 to 25 in each case relate to single-layered transparently colored sheets of different thickness which may be UV-stabilized and are produced on the extrusion line described, PET having different viscosities being used.

EXAMPLE 17

A 2 mm thick, transparently colored, amorphous sheet which comprises, as the main constituent, polyethylene terephthalate and 2% by weight of the soluble dyestuff Solvent Red 138, an anthraquinone derivative from BASF (®Thermoplast G) is produced.

The polyethylene terephthalate from which the transparently colored, amorphous sheet is produced has a standard viscosity SV (DCA) of 3490, which corresponds to an intrinsic viscosity IV (DCA) of 2.45 dl/g. The moisture content is <0.2% and the density (DIN 53479) is 1.35 g/cm³. The crystallinity is 19%, the crystallite melting point according to DSC measurements being 243° C. The crystallization temperature range $T_c$ is between 82° C. and 243° C. The poly-dispersity $M_w/M_n$; of the polyethylene terephthalate is 4.3, $M_w$ being 225,070 g/mol and $M_n$ being 52,400 g/mol. The glass transition temperature is 83° C.

The soluble dyestuff Solvent Red 138 is added in the form of a masterbatch. The masterbatch is composed of 20% by weight of the dyestuff Solvent Red 138 as the active compound component and 80% by weight of the polyethylene terephthalate described above as the carrier material.

Before the extrusion, 90% by weight of the polyethylene terephthalate and 10% by weight of the masterbatch are dried in a dryer at 170° C. for 5 hours, and are then extruded in a single-screw extruder at an extrusion temperature of 286° C. through a slot die onto a polishing calender, the rolls of which are arranged S-shaped, and polished to a sheet 2 mm thick. The first calender roll has a temperature of 73° C. and the subsequent rolls each have a temperature of 67° C. The speed of the take-off and of the calender rolls is 6.5 m/minute.

After the after-cooling, the transparently colored 2 mm thick PET sheet is trimmed at the edges with separating saws, cut to length and stacked.

The PET sheet produced, which is colored a transparent red, has the following profile of properties:

| | |
|---|---|
| Thickness | 2 mm |
| Surface gloss 1st side (Measurement angle 20°) | 135 |
| 2nd side | 132 |
| Light transmission | 35.8% |
| Clarity | 99.1% |
| Clouding | 3.2% |
| Surface defects per m² (specks, orange-peel, bubbles and the like) | none |
| Charpy impact strength $a_n$ | no fracture |
| Izod notched impact strength $a_k$ | 4.3 kJ/m² |
| Cold shaping | good, no defects |
| Crystallinity | 0% |
| Density | 1.33 g/cm³ |

EXAMPLE 18

A transparently colored, amorphous sheet is produced analogously to Example 17, a polyethylene terephthalate which has the following properties being employed:

| | |
|---|---|
| SV (DCA) | 2717 |
| IV (DCA) | 1.9 dl/g |
| Density | 1.38 g/cm³ |
| Crystallinity | 44% |
| Crystallite melting point $T_m$ | 245° C. |
| Crystallization temperature range $T_c$ | 82° C. to 245° C. |
| $M_n$ | 49,580 g/mol |
| $M_w$ | 175,640 g/mol |
| Polydispersity $M_w/M_n$ | 3.54 |
| Glass transition temperature | 82° C. |

The masterbatch is composed of 20% by weight of the dyestuff Solvent Red 138 and 80% by weight of the polyethylene terephthalate of this Example (SV 3490).

The extrusion temperature is 280° C. The first calender roll has a temperature of 66° C. and the subsequent rolls have a temperature of 60° C. The speed of the take-off and of the calender rolls is 2.9 m/minute.

The PET sheet produced which is colored a transparent red, has the following profile of properties:

| Thickness | 6 mm |
|---|---|
| Surface gloss 1st side (Measurement angle 20°) | 128 |
| 2nd side | 125 |
| Light transmission | 28.1% |
| Clarity | 98.9% |
| Clouding | 9.1% |
| Surface defects per m$^2$ (specks, orange-peel, bubbles and the like) | none |
| Charpy impact strength $a_n$ | no fracture |
| Izod notched impact strength $a_k$ | 4.8 kJ/m$^2$ |
| Cold shaping | good, no defects |
| Crystallinity | 0% |
| Density | 1.33 g/cm$^3$ |

EXAMPLE 19

A transparently colored, amorphous sheet is produced analogously to Example 17. The 2 mm thick, transparently colored sheet comprises 4% by weight of the soluble dyestuff Solvent Blue 35, a fat-soluble anthraquinone dyestuff from BASF (@Sudanblau 2).

The 4% by weight of the dyestuff Solvent Blue 35 are likewise added in the form of a masterbatch, the masterbatch being composed of 20% by weight of the dyestuff Solvent Blue 35 and 80% of the polyethylene terephthalate from Example 17. 80% by weight of the polyethylene terephthalate from Example 17 are employed with 20% by weight of the masterbatch.

The sheet produced, which is colored a transparent blue, has the following profile of properties:

| Thickness | 2 mm |
|---|---|
| Surface gloss 1st side (Measurement angle 20°) | 133 |
| 2nd side | 131 |
| Light transmission | 30.6% |
| Clarity | 99.0% |
| Clouding | 5.7% |
| Surface defects per m$^2$ (specks, orange-peel, bubbles and the like) | none |
| Charpy impact strength $a_n$ | no fracture |
| Izod notched impact strength $a_k$ | 4.6 kJ/m$^2$ |
| Cold shaping | good, no defects |
| Crystallinity | 0% |
| Density | 1.33 g/cm$^3$ |

EXAMPLE 20

A transparently colored sheet is produced analogously to Example 18. The 6 mm thick, transparently colored sheet comprises, as in Example 19, 4% by weight of the soluble dyestuff Solvent Blue 35, (OSudanblau 2 from BASF). As in Example 19, the 4% by weight of the dyestuff Solvent Blue 35 are added in the form of a masterbatch, the masterbatch being composed of 20% by weight of the dyestuff Solvent Blue 35 and 80% of the polyethylene terephthalate from Example 18.

The sheet produced, which is colored a transparent blue, has the following profile of properties:

| Thickness | 6 mm |
|---|---|
| Surface gloss 1st side (Measurement angle 20°) | 129 |
| 2nd side | 126 |
| Light transmission | 20.8% |
| Clarity | 98.4% |
| Clouding | 12.8% |
| Surface defects per m$^2$ (specks, orange-peel, bubbles and the like) | none |
| Charpy impact strength $a_n$ | no fracture |
| Izod notched impact strength $a_k$ | 5.0 kJ/m$^2$ |
| Cold shaping | good, no defects |
| Crystallinity | 0% |
| Density | 1.33 g/cm$^3$ |

EXAMPLE 21

A transparently colored sheet is produced analogously to Example 18. The extrusion temperature is 275° C. The first calender roll has a temperature of 57° C. and the subsequent rolls have a temperature of 50° C. The speed of the take-off and of the calender rolls is 1.7 m/minute.

The PET sheet produced has the following profile of properties:

| Thickness | 10 mm |
|---|---|
| Surface gloss 1st side (Measurement angle 20°) | 125 |
| 2nd side | 122 |
| Light transmission | 21.5% |
| Clarity | 98.4% |
| Clouding | 11.8% |
| Surface defects per m$^2$ (specks, orange-peel, bubbles and the like) | none |
| Charpy impact sstrength $a_n$ | no fracture |
| Izod notched impact strength $a_k$ | 5.3 kJ/m$^2$ |
| Cold shaping | good, no defects |
| Crystallinity | 0% |
| Density | 1.33 g/cm$^3$ |

EXAMPLE 22

A transparently colored sheet is produced analogously to Example 21, a polyethylene terephthalate which has the following properties being employed:

| SV (DCA) | 3173 |
|---|---|
| IV (DCA) | 2.23 dl/g |
| Density | 1.34 g/cm$^3$ |
| Crystallinity | 12% |
| Crystallite melting point $T_m$ | 240° C. |
| Crystallization temperature range $T_c$ | 82° C. to 240° C. |
| Polydispersity $M_w/M_n$ | 3.66 |
| Glass transition temperature | 82° C. |
| $M_w$ | 204,660 g/mol |
| $M_n$ | 55,952 g/mol |

The extrusion temperature is 274° C. The first calender roll has a temperature of 50° C. and the subsequent rolls have a temperature of 45° C. The speed of the take-off and of the calender rolls is 1.2 m/minute.

The transparently colored PET sheet produced has the following profile of properties:

| Thickness | 15 mm |
|---|---|
| Surface gloss 1st side (Measurement angle 20°) | 120 |
| 2nd side | 118 |
| Light transmission | 18.2% |
| Clarity | 96.4% |
| Clouding | 20.6% |
| Surface defects per m² (specks, orange-peel, bubbles and the like) | none |
| Charpy impact strength $a_n$ | no fracture |
| Izod notched impact strength $a_k$ | 5.9 kJ/m² |
| Cold shaping | good, no defects |
| Crystallinity | 0% |
| Density | 1.33 g/cm³ |

EXAMPLE 23

A transparently colored sheet is produced analogously to Example 18. 60% of polyethylene terephthalate from Example 18 are mixed with 30% of recycled material from this polyethylene terephthalate and 10% of the masterbatch.

The transparently colored sheet produced has the following profile of properties:

| Thickness | 6 mm |
|---|---|
| Surface gloss 1st side (Measurement angle 20°) | 122 |
| 2nd side | 120 |
| Light transmission | 28.2% |
| Clarity | 98.9% |
| Clouding | 9.9% |
| Surface defects per m² (specks, orange-peel, bubbles and the like) | none |
| Charpy impact strength $a_n$ | no fracture |
| Izod notched impact strength $a_k$ | 4.9 kJ/m² |
| Cold shaping | good, no defects |
| Crystallinity | 0% |
| Density | 1.33 g/cm³ |

EXAMPLE 24

A 2 mm thick, transparently colored, amorphous sheet which comprises, as the main constituent, the polyethylene terephthalate and the dyestuff from Example 17 and 1.0% by weight of the UV stabilizer 2-(4,6-diphenyl-1,3,5-triazin-2-yl)-5-(hexyl)-oxyphenyl (®Tinuvin 1577 from Ciba-Geigy) is produced analogously to Example 17. Tinuvin 1577 has a melting point of 149° C. and is heat-stable up to about 330° C.

1.0% by weight of the UV stabilizer is incorporated into the polyethylene terephthalate directly by the producer of the raw materials.

The drying, extrusion and process parameters are chosen as in Example 17.

The PET sheet produced, which is colored a transparent red, has the following profile of properties:

| Thickness | 2 mm |
|---|---|
| Surface gloss 1st side (Measurement angle 20°) | 129 |
| 2nd side | 126 |
| Light transmission | 34.7% |
| Clarity | 99.0% |
| Clouding | 3.4% |
| Surface defects per m² (specks, orange-peel, bubbles and the like) | none |
| Charpy impact strength $a_n$ | no fracture |
| Izod notched impact strength $a_k$ | 4.6 kJ/m² |
| Cold shaping | good, no defects |
| Crystallinity | 0% |
| Density | 1.33 g/cm³ |

After weathering for in each case 1000 hours per side with the Atlas Ci 65 Weather Ometer, the PET sheet has the following properties:

| Thickness | 2 mm |
|---|---|
| Surface gloss 1st side (Measurement angle 20°) | 122 |
| 2nd side | 119 |
| Light transmission | 34.5% |
| Clarity | 99.0% |
| Clouding | 3.5% |
| Total discoloration ΔE | 0.34 |
| Surface defects (cracks, embrittlement) | none |
| Charpy impact strength $a_n$ | no fracture |
| Izod notched impact strength $a_k$ | 4.1 kJ/m² |
| Cold shaping | good |

EXAMPLE 25

A 2 mm thick, transparently colored sheet is produced analogously to Example 24. The UV stabilizer 2-(4,6-diphenyl-1,3,5-triazin-2-yl)-5-(heyl)-oxyphenyl (®Tinuvin 1577) is metered in in the form of a masterbatch. The masterbatch is composed of 5% by weight of OTinuvin 1577 as the active compound component and 95% by weight of the polyethylene terephthalate from Example 17.

Before the extrusion, 80% by weight of the polyethylene terephthalate from Example 17 are dried with 20% by weight of the masterbatch at 170° C. for 5 hours. The extrusion and sheet production are carried out analogously to Example 17.

The transparent, amorphous pet sheet produced has the following profile of properties:

| Thickness | 2 mm |
|---|---|
| Surface gloss 1st side (Measurement angle 20°) | 125 |
| 2nd side | 122 |
| Light transmission | 34.9% |
| Clarity | 99.1% |
| Clouding | 3.3% |
| Surface defects per m² (specks, orange-peel, bubbles and the like) | none |
| Charpy impact strength $a_n$ | no fracture |
| Izod notched impact strength $a_k$ | 4.0 kJ/m² |
| Cold shaping | good |

-continued

| | |
|---|---|
| Crystallinity | 0% |
| Density | 1.33 g/cm³ |

After weathering for in each case 1000 hours per side with the atlas ci 65 weather Ometer, the pet sheet has the following properties:

| | |
|---|---|
| Thickness | 2 mm |
| Surface gloss 1st side (Measurement angle 20°) | 120 |
| 2nd side | 117 |
| Light transmission | 34.6% |
| Clarity | 99.0% |
| Clouding | 3.5% |
| Total discoloration ΔE | 0.32 |
| Surface defects (cracks, embrittlement) | none |
| Charpy impact strength $a_n$ | no fracture |
| Izod notched impact strength $a_k$ | 4.0 kJ/m² |
| Cold shaping | good, |

What is claimed is:

1. A transparently colored, amorphous sheet having a thickness in the range from 1 to 20 mm, which comprises, as the main constituent, a crystallizable thermoplastic in which is mixed at least one dyestuff which is soluble in the thermoplastic.

2. A sheet as claimed in claim 1, in which the concentration of the soluble dyestuff is in the range from 0.001 to 20% by weight, based on the weight of the crystallizable thermoplastic.

3. A sheet as claimed in claim 1 in which the soluble dyestuff is a fat- and aromatics-soluble azo or anthraquinone dyestuff.

4. A sheet as claimed in claim 1, in which the surface gloss, measured in accordance with DIN 67530 (measurement angle 20°), is greater than 100.

5. A sheet as claimed in claim 1, in which the light transmission, measured in accordance with ASTM D 1003, is in the range from 5 to 80%.

6. A sheet as claimed in claims 1, in which the clouding, measured in accordance with ASTM D 1003, is in the range from 2 to 40%.

7. A sheet as claimed in claim 1, in which the crystallizable thermoplastic employed has a standard viscosity SV (DCA), measured in dichloroacetic acid in accordance with DIN 53728, which is in the range from 800 to 6000.

8. A sheet as claimed in claim 7, in which the crystallizable thermoplastic employed has a standard viscosity SV (DCA), measured in dichloroacetic acid in accordance with DIN 53728, which is in the range from 950 to 5000.

9. A sheet as claimed in claim 1, which has a degree of crystallinity of less than 5%.

10. A sheet as claimed in claim 1, in which the crystallizable thermoplastic is chosen from polyethylene terephthalate (PET), polybutylene terephthalate (PBT), a cycloolefin polymer and a cycloolefin copolymer.

11. A sheet as claimed in claim 10, in which polyethylene terephthalate is used as the crystallizable thermoplastic.

12. A sheet as claimed in claim 11, in which the polyethylene terephthalate comprises polyethylene terephthalate recycled material.

13. A sheet as claimed in claim 11 in which no fracture occurs during measurement of the Charpy impact strength $a_n$ measured in accordance with ISO 179/1D.

14. A sheet as claimed in claim 11, in which the Izod notched impact strength $a_k$, measured in accordance with ISO 180/1A, is in the range from 2.0 to 8.0 kJ/m².

15. A sheet as claimed in claim 11, in which the image sharpness, measured in accordance with ASTM D 1003 under an angle of less than 2.5°, is greater than 93%.

16. A sheet as claimed in claim 11, in which the polyethylene terephthalate has a crystallite melting point, measured by DSC at a heating-up rate of 10° C./minute, in the range from 220° C. to 280° C.

17. A sheet as claimed in claim 11, in which the polyethylene terephthalate has a crystallization temperature, measured by DSC with a heating-up rate of 10° C/minute, in the range from 75° to 280° C.

18. A sheet as claimed in claim 11, in which the polyethylene terephthalate employed has a crystallinity in the range from 5 to 65%.

19. A sheet as claimed in claim 1, which additionally comprises a UV stabilizer.

20. A sheet as claimed in claim 19, in which the concentration of the UV stabilizer is in the range from 0.01 to 5% by weight, based on the weight of the crystallizable thermoplastic.

21. A sheet as claimed in claim 19, in which at least one UV stabilizer chosen from 2-hydroxybenzotriazoles and triazines is used.

22. A sheet as claimed in claim 21, in which at least one UV stabilizer chosen from 2-(4,6-diphenyl-1,3,5-triazin-2-yl)-5-(hexyl)oxy-phenyl and 2,2'-methylene-bis(6-(2H-benzotriazol-2-yl)-4-(1,1,3,3-tetramethylbutyl)-phenol is used.

23. A process for the production of a transparently colored, amorphous sheet as claimed in one of the preceding claims, which comprises the following steps: melting of the crystallizable thermoplastic together with the dyestuff in an extruder, shaping of the melt through a die and subsequent sizing, polishing and cooling with at least two rolls in the polishing stack, before the sheet is cut to size, the first roll of the polishing stack having a temperature in the range from 50° C. to 80° C.

24. The process as claimed in claim 23, wherein the crystallizable thermoplastic is dried before being melted.

25. The process as claimed in claim 23, wherein the UV stabilizer is melted in the extruder together with the dyestuff and the thermoplastic.

26. The process as claimed in claim 23, wherein the addition of the dyestuff and/or of the UV stabilizer is carried out via masterbatch technology.

27. The process as claimed in claim 23, wherein PET is used as the crystallizable thermoplastic.

28. The process as claimed in claim 27, wherein the PET is dried at 160° to 180° for 4 to 6 hours before being melted.

29. The process as claimed in claim 27, wherein the temperature of the PET melt is in the range from 250° to 320°.

30. In a method of producing shaped articles, the improvement which comprises using the colored, amorphous sheet as claimed in claim 1.

31. The method according to claim 30, wherein the articles produced thereby are for interior use and for exhibition construction.

32. The method according to claim 30, wherein the articles produced thereby are for outdoor use and wherein the sheet is treated with a UV stabilizer.

* * * * *